United States Patent [19]
Dombrowski

[11] Patent Number: 5,901,336
[45] Date of Patent: May 4, 1999

[54] BONDING BERYLLIUM TO COPPER ALLOYS USING POWDER METALLURGY COMPOSITIONAL GRADIENTS

[75] Inventor: David E. Dombrowski, Hudson, Ohio

[73] Assignee: Brush Wellman Inc., Cleveland, Ohio

[21] Appl. No.: 08/705,929

[22] Filed: Aug. 30, 1996

[51] Int. Cl.$^6$ ...................................................... B22F 3/10
[52] U.S. Cl. .................................. 419/6; 419/7; 419/48
[58] Field of Search .............................. 418/547; 419/6, 419/7, 38, 48

[56] References Cited

U.S. PATENT DOCUMENTS

| | | | |
|---|---|---|---|
| 3,515,188 | 6/1970 | Lebedev et al. | |
| 5,198,154 | 3/1993 | Yokoyama et al. | 252/514 |
| 5,579,534 | 11/1996 | Itoh et al. | 428/547 |
| 5,707,725 | 1/1998 | Feldstein et al. | 428/325 |

FOREIGN PATENT DOCUMENTS

| | | |
|---|---|---|
| 531312 | 11/1957 | Belgium . |
| 0104711A2 | 4/1984 | European Pat. Off. . |

OTHER PUBLICATIONS

McDonnell Douglas, "U.S. Design Support Study for the ITER Divertor", Summary Report, Feb.–Sep., 1993.
Altmann et al., "An Analysis of Induction Brazed beryllium on Copper Alloy Substrates", 15th IEEE Symposium on Fusion Engineering, Hyannis, MA, Oct. 11–15, 1993.
Ibbot et al., "Further Developments in the Brazing of Beryllium to CuCrZr", Soft–18 conference. (undated).
ITER, DOE/ER–ITER–0004, "Fusion as a Future Energy Source", U.S. Government Printing Office, 1993.
ITER, International Atomic Energy Agency, "Relevant Documents Initiating The EDA", Vienna, 1993.
Floyd et al., "Joining III: Diffusion Bonding", Beryllium Science and Technology, vol. 2, Chapter 14, pp. 275–297, 1979.
Franconi et al., "Development of Beryllium Bonds for Plasma–Facing Components", Journal of Nuclear Materials, pp. 493–498, Elsevier Science Publishers, 1992.
Watson, "High Heat Flux Issues for Plasma Facing Components in Fusion Reactors", Sandia National Laboratories, Fusion Technology Department, Presented at SPIE, San Diego, California, Jul., 1992.
Conn et al., "The International Thermonuclear Experimental Reactor", Scientific American, Apr. 1992, pp. 103–110.

(List continued on next page.)

Primary Examiner—Daniel J. Jenkins
Attorney, Agent, or Firm—Calfee, Halter & Griswold

[57] ABSTRACT

A process for bonding a first metal such as beryllium to a second metal such as a copper alloy using a powder metallurgy compositional gradient. According to one aspect of the present invention, a sequence of powder layers is located between beryllium and copper alloy pieces, the layers containing mixtures of a beryllium powder and a copper powder, e.g., of a copper alloy, high purity copper and/or the like. The composition of the layers is adjusted such that the layer adjacent the beryllium piece is beryllium rich, and so that the layers become progressively richer in copper as they get closer to the copper piece. The variation in composition between the pieces produces the compositional gradient. Bonding of the beryllium and copper alloy pieces is then accomplished by a hot consolidation technique such as hot isostatic pressing, vacuum hot pressing, solid state bonding or diffusion bonding at a temperature generally within a range of 500° and 800° C. The resulting bond strength is in excess of about 35 MPa at a temperature generally within a range of room temperature and 400° C.

18 Claims, 4 Drawing Sheets

OTHER PUBLICATIONS

Switz, "Joining I: Mechanical/Adhesive", Beryllium Science and Technology, vol. 2, Chapter 12, Plenum Publishing Corp., 1979.

Grant, "Joining II: Brazing and Soldering", Beryllium Science and Technology, vol. 2, Chapter 13, Plenum Pub. Corp., 1979.

Thomas, "Results of JET Operation with Beryllium", Journal of Nuclear Materials, pp. 3–13, Elsevier Science Publishers, 1990.

Watson, "Beryllium Joining Development", DOE Beryllium Review Panel, Sandia National Laboratory, Jun. 7, 1994.

Hanafee, "Joining Beryllium to Itself and Other Metals", Presentation to ITER Panel, Lawrence Livermore Natl. Lab., Chemistry & Materials Science Department, Jul., 1994.

McCarthy, "ES&H Issues Important To Braze Selection", Fusion Safety Program, U.S. Home Team copper Joining Workshop, Argonne National Lab, Jan. 26, 1995.

Manly et al., "Proposed Manufacturing Methods To Produce Beryllium Parts for ITER", Report of a Technical Evaluation Panel, Aug., 1995.

Sakamoto et al., "Preliminary Characterization of Interlayer for Be–Cu Functionally Gradient Materials", Journal of Nuclear Materials, 1996.

European Search Report, corresponding European Application No. EP 97 115007.

Fig.1

LIMITS ON ELEMENTS SO MATERIAL QUALIFIES AS CLASS C WASTE

BONDING BERYLLIUM TO COPPER ALLOYS USING POWDER METALLURGY COMPOSITIONAL GRADIENTS

FIELD OF THE INVENTION

The present invention relates to bonding commercially pure metals to alloys and more particularly to the formation of bonds between beryllium and copper alloys that withstand extreme temperatures and other environmental conditions.

BACKGROUND OF THE INVENTION

In a nuclear fusion reaction, hydrogen isotope plasmas typically react in a hollow, toroidal vessel under extraordinarily high temperatures to produce helium, neutrons, and energy. Since the reactants have ionic charges, they are confined initially by a strong magnetic field within the reactor. The products of the reaction, however, are not charged, often escaping the magnetic confinement of the reactor, and striking the vessel walls (first wall or plasma facing components).

The unique properties of beryllium make it particularly desirable for application to these reactors. The properties include an extraordinarily high affinity for the gaseous contaminants of fusion plasma, a tendency to decrease disruption event frequency, a low atomic number, high thermal conductivity, and a comparatively low tritium retention. Beryllium has been found useful, for instance, as armor for the first (or entire) wall of reactors. With reactors having a modest power output, beryllium may also serve as a diverter, such as large monolithic tiles which absorb the heat generated by the fusion reaction.

State of the art reactors presently under development are expected to impose steady state heat loads on the beryllium between 0.5 and 5 $MW/m^2$, and transient heat loads of 25 $MW/m^2$ or higher. Unless the beryllium is cooled, these transient heat loads bring it dangerously close to its melting point in a relatively short time. Based on engineering and safety considerations, water cooled copper alloy substrates have been used to cool the beryllium. It has been found, however, that sufficient heat transfer efficiencies can only be achieved if there is a uniform bond between the beryllium and the copper alloy. Even upon water cooling the alloy, the bond line temperature has been known to reach 200° to 400° C. Hence, in addition to thermal criteria, a beryllium to copper alloy bond for use in fusion reactors is slated to meet a series of other relatively stringent requirements.

First, the bond should exhibit "good" bond strength (>about 30 MPa) in the temperature range of 200° and 400° C.

Second, constituent materials of the bond should permit heat to be transferred between the beryllium and the copper alloy without becoming dangerously radioactive. Neither radioactive daughter elements nor low melting point daughter elements produced by the bonding materials are considered acceptable.

Third, large surface areas on the order of 2000 $m^2$ should be covered by the bonded beryllium to copper alloy material. Hence, the bonding technique must be capable of being scaled readily to a selected commercial operation.

Finally, bond defect levels desired are lower than about 1%, the defect level of brazing operations presently used in Tore Supra fusion reactors.

Attempts to accommodate these requirements have included the development of a 90% In-10% Ag alloy for use in beryllium soldering, zinc, aluminum based alloys, and silver based alloys for brazing beryllium to itself. Diffusion bonding technology has also been considered, including homogeneous silver alloy interlayers and the use of homogeneous silver alloy sputtered coatings as intermediate bonding layers.

Conventional methods of bonding beryllium to copper alloys include the application of various intermediate layer materials traditionally used for brazing beryllium to itself and to other metals. However, thermal stresses have resulted from a mismatch between the coefficient of thermal expansion of beryllium and that of copper alloys. This has implications relatively important to the selection of a bonding temperature.

A uniform bond between beryllium and a copper alloy, with the requisite mechanical properties at elevated temperatures, has been attained by a silver based, vacuum induction brazing process. Although relatively good shear strengths of 220 MPa at room temperature and 150 MPa at 400° C. were reported, the process uses a silver alloy as the intermediate bonding layer. Silver, it has been found, exhibits undesirable behavior upon neutron irradiation, and is considered generally unacceptable for advanced nuclear fusion applications.

Attempts have been made to duplicate the results of induction brazing, for example, by hot isostatic pressing solid beryllium to a solid copper alloy using a silver based interlayer. The resulting bond strengths, however, have been on the order of 30 MPa which are considered inferior.

SUMMARY OF THE INVENTION

In accordance with one aspect of the present invention is a process for bonding beryllium to copper alloys using a powder metallurgy compositional gradient. A sequence of powder layers is located between solid beryllium and solid copper alloy pieces, the layers containing mixtures of beryllium and copper powders. The composition of the layers is adjusted such that the layer adjacent the beryllium piece is beryllium rich, and so that the layers become progressively richer in copper as they get closer to the solid copper piece. This variation in composition in the space between the pieces produces the compositional gradient. Bonding is then accomplished by a hot consolidation technique including but not limited to hot isostatic pressing, vacuum hot pressing, solid state bonding or diffusion bonding at a temperature generally within a range of 500° and 800° C. The resulting bond strength is in excess of about 35 MPa at a temperature generally within a range of room temperature and 400° C.

In accordance with another aspect of the present invention is a process for bonding beryllium to copper alloys using a powder metallurgy compositional gradient. A sequence of powder layers is placed between solid beryllium and solid copper alloy forms where the powder layers are composed of beryllium powder, copper powder, and one or more selected bonding aids in powder form. Each bonding aid is selected on the basis of being safer than neutron irradiated silver and its resistance to formation of beryllium compounds below about 700° C. Examples include germanium, aluminum, silicon, and tellurium. The composition of the layers is adjusted such that the layer next to the beryllium form is beryllium rich, and so that the layers become progressively richer in copper as they approach the solid copper form. Bonding is then accomplished by a hot consolidation technique such as hot isostatic pressing, vacuum hot pressing, solid state bonding or diffusion bonding at a temperature generally within a range of 500° and 800° C. The resulting bond strengths should exceed about 35 MPa at a temperature generally within a range of room temperature and 400° C.

According to a further aspect of the present invention is a bond between beryllium and copper alloy pieces which, during at least one step of bonding, comprises a sequence of powder layers containing mixtures of beryllium and copper powders, the composition of the layers being adjusted such that the layer adjacent the beryllium piece is beryllium rich, the succeeding layers becoming progressively richer in copper as they get closer to the copper piece, such that a powder metallurgy compositional gradient is formed across the layers.

In accordance with yet another aspect of the present invention there is provided a bond between beryllium and copper alloy forms which, during at least one step of bonding, comprises a sequence of powder layers composed of a beryllium powder, a copper powder, and at least one bonding aid in powder form selected on the basis of being safer than neutron irradiated silver and its resistance to formation of beryllium compounds below about 700° C., the composition of the layers being adjusted such that the layer adjacent the beryllium form is beryllium rich, the succeeding layers becoming progressively richer in copper as they get closer to the copper alloy form, such that a powder metallurgy compositional gradient is formed across the layers.

Although the present invention is shown and described in connection with bonding beryllium to a copper alloy, it may be adapted for strengthening bonds and improving resistance to healing other compositions, within the spirit and scope of the present invention.

Accordingly, it is an object of the present invention to strengthen the bonded region of a beryllium to copper alloy bond.

Another object of the present invention is to provide a beryllium to copper alloy bond that withstands the extreme conditions of a nuclear fusion reactor.

A further object of the present invention is to provide a beryllium to copper alloy bond with improved mechanical properties in the bonded region.

Yet another object of the present invention is to provide a beryllium to copper alloy bond that exhibits superior resistance to degradation during handling.

Still another object of the present invention is to achieve beryllium to copper alloy bond strengths above about 30 MPa at a temperature generally within a range of room temperature and 400° C., without the use of a silver bonding aid.

The present invention will now be further described by reference to the following drawings which are not intended to limit the accompanying claims.

BRIEF DESCRIPTION OF THE DRAWINGS

FIG. 1 is a periodic chart of the elements which sets forth limits of element concentrations which can be tolerated in a beryllium to copper alloy bond during use in neutron irradiation conditions for disposal as a Class C waste;

The same numerals are used throughout the figure drawings to designate similar elements. Still other objects and advantages of the present invention will become apparent from the following description of the preferred embodiments.

DETAILED DESCRIPTION OF THE PREFERRED EMBODIMENTS

Figure 2:
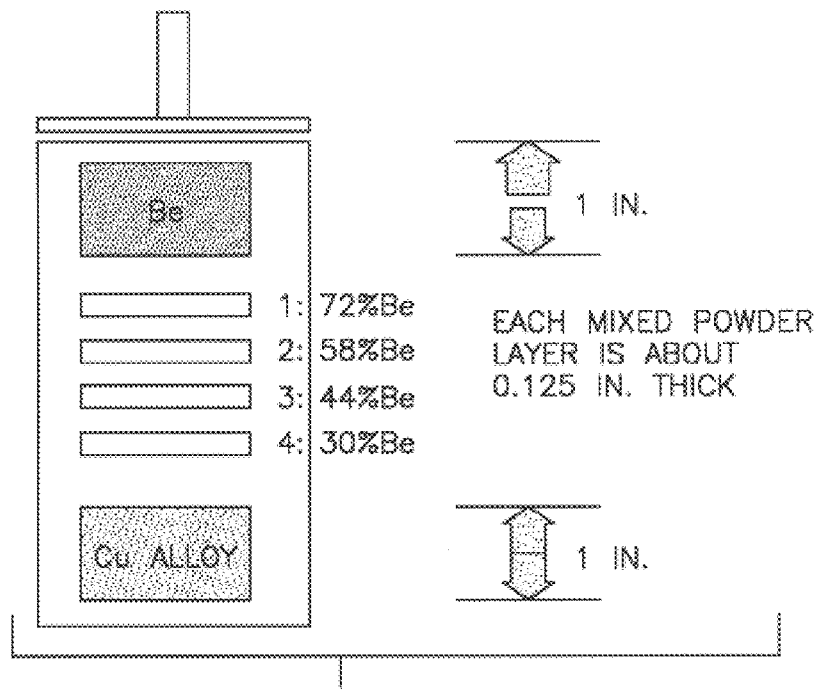
FIG. 2 is a diagrammatic representation of an HIP can before consolidation using the process set forth in Example I.

Nuclear fusion applications generally require a beryllium to copper alloy bond strength of greater than about 30 MPa (4.3 ksi) at room temperature. The bond should also be able to withstand temperatures up to about 400° C. Nuclear fusion applications, in addition, may require that all bonding materials present less risk of radioactivity after neutron bombardment. Desirable attributes include the following: the irradiated material should have a low contact dose, be classified as a Class C waste material, form no highly radioactive daughter products, and release no radioactive material into the surrounding atmosphere.

Criteria for materials which provide safe levels of radioactivity are outlined in FIG. 1. In particular, FIG. 1 shows guidelines for limits of element concentrations which can be tolerated in a beryllium to copper alloy bond during use in neutron irradiation conditions for disposal as a Class C waste. This assumes 5 MW/m$^2$ for 4 years. (See, e.g., Piet et al., Initial Integration of Accident Safety, Waste Management, Recycling, Effluent, and Maintenance Considerations of Low-Activation Materials, "Fusion Technology", Vol. 19, Jan. 1991, pp. 146–161). Generally speaking, acceptable materials are those which have a higher allowable concentration than that of silver.

The present invention meets these criteria through the combination of compositional gradient powder layers, the use of low neutron activation materials in the layers, and by hot consolidation processing which provides bond strengths greater than about 35 MPa (4.3 ksi). For instance, beryllium and copper powders, and bonding aids such as aluminum, silicon, germanium, and tellurium, each have safer neutron activation characteristics than silver. The bonding aids are preferably chosen from materials which resist formation of beryllium compounds at relatively low temperatures (<about 700° C.). Furthermore, the present invention uses compositional gradient layers, and makes the layers using powders and by powder metallurgy methods.

In accordance with one aspect of the present invention, a sequence of powder layers is located between solid beryllium, e.g., vacuum, hot pressed S-65C Grade Be, and solid copper alloy pieces, e.g., C10100, the powder layers containing mixtures of beryllium and copper powders, e.g., a powder of a copper alloy, high purity copper and/or the like. The composition of the layers is adjusted such that the layer next to the beryllium piece is beryllium rich, and so that the layers become progressively richer in copper as they get closer to the solid copper piece. This variation in composition in the space between the pieces produces a compositional gradient. Preferably, bonding is then accomplished by a hot consolidation technique including, but not limited to, hot isostatic pressing, vacuum hot pressing, solid state bonding or diffusion bonding at a temperature generally within a range of 500° and 800° C. The resulting bond strength is in excess of about 35 MPa at a temperature generally within a range of room temperature and 400° C.

According to another aspect of the present invention, a sequence of powder layers is placed between solid beryllium and solid copper alloy forms where the powder layers are composed of beryllium powder, copper powder, e.g., of a copper alloy, high purity copper and/or the like, and one or more selected bonding aids in powder form. Each bonding aid is selected on the basis of being safer than neutron irradiated silver, e.g., silver after being irradiated by neutrons, and its resistance to formation of beryllium compounds below about 700° C. Examples include germanium, aluminum, silicon, and tellurium. The composition of the layers is adjusted so that the layer next to the beryllium form is beryllium rich, and such that the layers become progressively richer in copper as they approach the solid copper form. Preferably, bonding is then accomplished by a hot consolidation technique such as hot isostatic pressing, vacuum hot pressing, solid state bonding or diffusion bonding at a temperature generally within a range of 500° and 800° C. The resulting bond strength should exceed about 35 MPa generally within a range of room temperature and about 400° C.

Although bond strengths exceeding about 35 MPa are generally described by this invention, strengths in excess of about 100 MPa have been achieved, which are preferred for nuclear fusion applications. In addition, while the present invention is shown and described in connection with bonding beryllium to a copper alloy, it may be adapted for strengthening bonds and improving resistance to heat in other compositions. For example, compositions of the gradient material may also be strengthened, within the spirit and scope of the present invention.

The compositional gradient powder layers are preferably cold pressed before insertion between solid beryllium and solid copper alloy forms. Also, it is preferred that the beryllium containing powder particles be an intimate mixture of beryllium and a selected second metal, made either by inert gas atomization or other rapid solidification process. The second metal may include but is not limited to aluminum. The quantity of the second metal may vary from about 1% to about 99% by weight.

By using a series of mixed powder layers between solid beryllium and solid copper alloy, according to the present invention, the performance of hot isostatic pressing, vacuum hot pressing, diffusion bonding, or solid state bonding of beryllium to copper alloys is improved dramatically. Beryllium is bonded to copper alloys by hot isostatic pressing (HIP) or vacuum hot pressing (VHP) using compositional gradient layers made of powder mixtures and a bonding aid in powder form. The powder mixtures consist, for example, of beryllium, a copper alloy or high purity copper, and a bonding aid.

Bonding aids in the gradient are chosen for their low neutron activation characteristics and for resistance to formation of beryllium chemical compounds at relatively low temperatures (<about 700° C.). The bonding aid should also have a melting point greater than about 400° C. Generally speaking, if the compositional gradient consists of materials X, Y and Z, a series of powder mixtures is made where the proportion of each component material varies systematically and progressively. For example, as the percentage of X declines, the percentage of Y+Z increases. The relative amount of component Y in the Y+Z mixture may also be so varied.

The powder batches are then placed as discrete layers in a die or HIP can on top of the copper alloy solid. This is done such that the percentage of one component systematically increases from the first layer to the last layer, and the percentage of another component systematically decreases over the same span. The percentage of any third or more component, e.g., a bonding aid, may increase, decrease, stay the same, or increase to a selected peak level in a middle layer, then decrease, within the spirit and scope of the present invention. Some examples of bonding aids include silicon, germanium, tellurium, and aluminum-beryllium alloy powders (e.g., AlBeMet®).

EXAMPLE I

Shown in FIG. 2 is a schematic cross section of an HIP can before solidation by a process according to the present invention. The four layers illustrated are mechanical mixtures of beryllium and copper powders. The percent beryllium in the layers by volume is as follows: layer 1–72% Be; layer 2–58% Be, layer 3–44% Be; and layer 4–30% Be.

Two sets of Be/Cu powder mixtures were weighed out, as shown in Table I, using atomized spherical beryllium powder and pure copper powder, i.e., high purity copper. Each powder mixture was mixed in a vial by manual agitation.

TABLE I

| Composition of Each Layer of Mixed Be and Cu Powders | | | |
| --- | --- | --- | --- |
| Layer | Vol % Be | g Be | g Cu |
| 1 | 72 | 2.37 | 4.47 |
| 2 | 58 | 1.71 | 6.70 |
| 3 | 44 | 1.45 | 8.94 |
| 4 | 30 | 0.99 | 11.17 |

The solid beryllium and copper alloy pieces to be bonded were etched prior to insertion in HIP cans. Each can was made using a steel tube having a 1.488 in. inner diameter and a wall thickness of about $\frac{1}{8}$ in. The tubes were initially cut to length, then the bottom was welded on. The lids with degassing tubes were made by welding. The interior of each can was cleaned with a water based degreasing agent.

Preferable results are obtained if the pieces are etched and put in the HIP cans the same day. A beryllium etchant solution was made consisting of about 45 vol % $HNO_3$ and about 2 vol % HF. The beryllium pieces were etched for approximately 10 minutes, then removed and rinsed several times in distilled water. At this point, the beryllium was handled with gloves to avoid surface contamination from skin oils. The beryllium was dried with methanol and stored in a desiccator. Next, a copper etchant solution of about 10 vol % $H_2SO_4$ was made. The copper pieces were dipped in the solution for about 5 seconds, dried with methanol, and stored in a desiccator.

Although cylindrical HIP cans and cylindrical pieces of beryllium and copper alloy, here commercially pure copper, were used for this example, it is appreciated that a wide variety of shapes may be bonded in this manner, within the spirit and scope of the present invention. Hot isostatic pressing, for example, is recognized for its versatility in producing powder components of complex shapes which can be very close to the final shape of the component.

The contents of the HIP cans were inserted according to FIG. 2 and Table II. Gloves were used to put the cylindrical copper pieces in the bottom of each can. Powder layer 4 was then placed on top of each copper cylinder. Next, powder layers 3 to 1 were placed in the cans in reverse order. Gloves were used to position the beryllium cylinder on top of powder layer 1 in each HIP can.

TABLE II

HIP Cans Numbers and HIP Temperatures

| HIP Can No. | Contents | HIP Temp. (°C.) |
|---|---|---|
| 1468 | Be Atomized Spherical Powder and Cu powder | 700 |
| 1470 | Be Atomized Spherical Powder and Cu powder | 600 |

A lid with degassing tube was welded on each HIP can, and the cans were degassed under vacuum following a sequence of temperatures. The cans were also hot isostatically pressed (HIP'd) at temperatures shown in Table II, and at a pressure of about 172.3 MPa for approximately one hour.

The cans were removed from the bonded specimens, and tensile samples were then machined such that the bond interface was at the center of the tensile sample gage length.

Application bond strength was demonstrated preferably using a reduced section tensile specimen. This specimen was made, e.g., by modifying a rectangular specimen 2 in. tall, 0.720 in. wide, and 0.188 in. thick. A central gauge section 0.675 in. long and 0.25 in. wide was machined with the bond at its center point. 0.25 in. radius curves were machined between the gauge section and the gripping ends. A pin loading hole 0.25 in. in diameter was placed 0.375 in. from each end.

Standard tensile testing was then conduced at room temperature, about 200° C., and about 400° C. The results are shown in Table III.

TABLE III

Results of tensile testing the beryllium to copper bonds made using beryllium and copper compositional gradient powder layers, according to Example I.

| | Tensile Strength of Bond (MPa) | | |
|---|---|---|---|
| HIP Can No. | Room Temp. | 200° C. | 400° C. |
| 1468 | 142 | 141 | 96.5 |
| | | | 95.8 |
| 1470 | 88.2 | 112 | 90.3 |
| | | | 94.5 |

These bond strengths are a substantial improvement over any known technology for bonding beryllium to copper alloys without the use of a silver bonding aid. The room temperature bond strength was at least as good as the strength at room temperature of beryllium brazed to itself by aluminum or zinc. The beryllium to copper alloy bond strength at 400° C. was about five times greater than that of brazed beryllium.

Figure 3A:
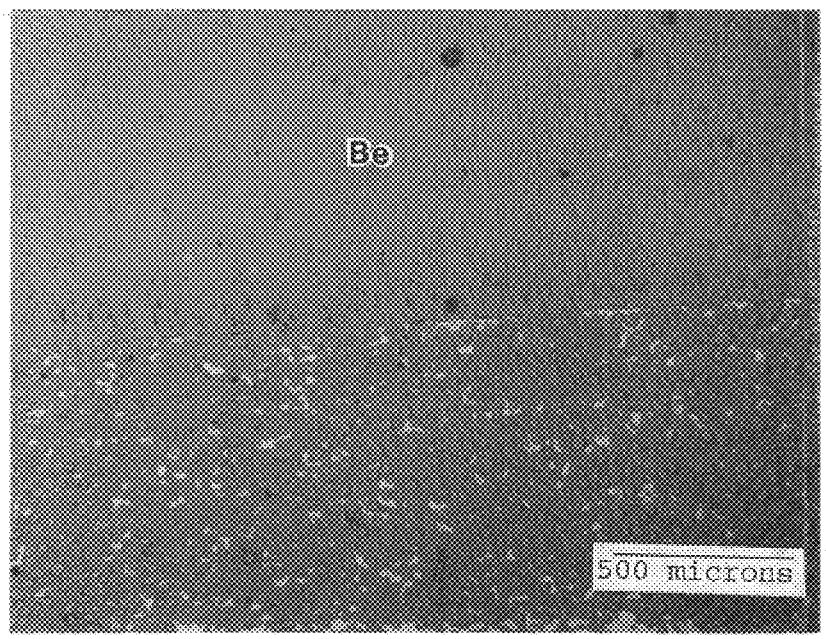
FIG. 3a is a micrograph at 50×magnification showing the structure of the bond produced in HIP can 1468 of Example I at the beryllium rich bonding layers directly below the beryllium cylinder.
Figure 3B:
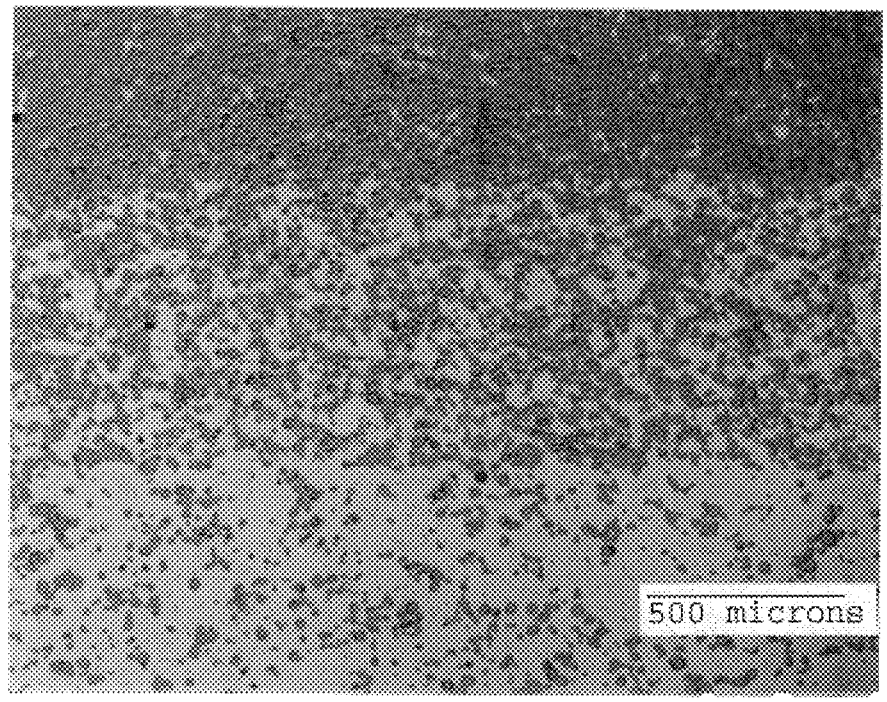
FIG. 3b is a micrograph at 50×magnification showing the structure of the bond produced in HIP can 1468 of Example I between the beryllium rich bonding layers of FIG. 3a and the copper rich bonding layers directly above the copper cylinder.
Figure 3C:
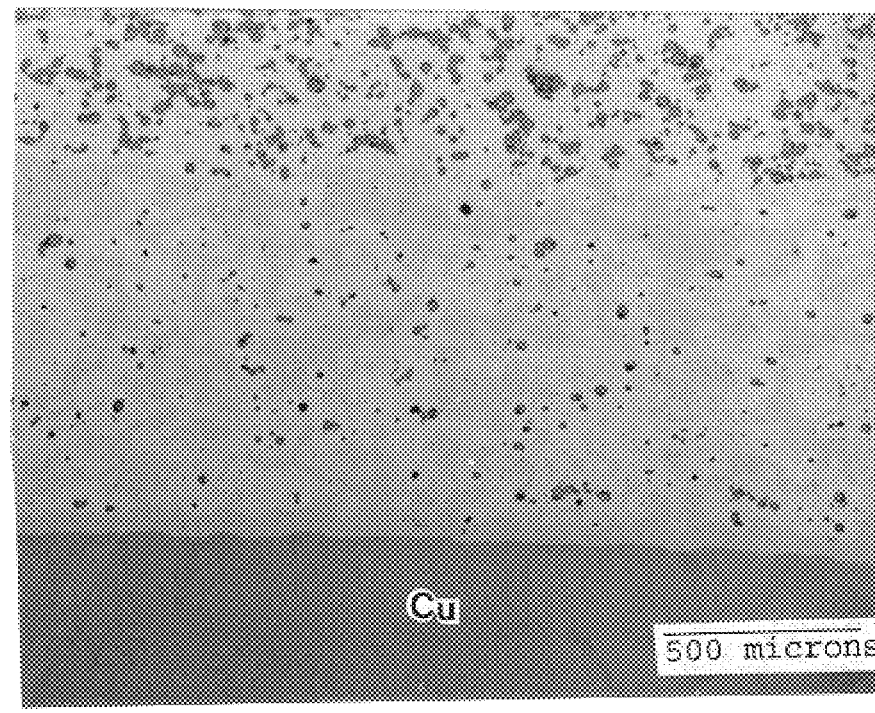
FIG. 3c is a micrograph at 50×magnification showing the structure of the bond produced in HIP can 1468 of Example I at the copper rich bonding layers directly above the copper cylinder.

FIGS. 3a–c show an overlapping sequence of bright field photomicrographs at 50×magnification showing the 500 micron grain structure of the bond produced in HIP can 1468. FIG. 3a shows beryllium rich bonding layers directly below the beryllium cylinder and FIG. 3b illustrates bonding layers between FIGS. 3a and 3c. FIG. 3c shows copper rich bonding layers directly above the copper cylinder.

Figure 4A:
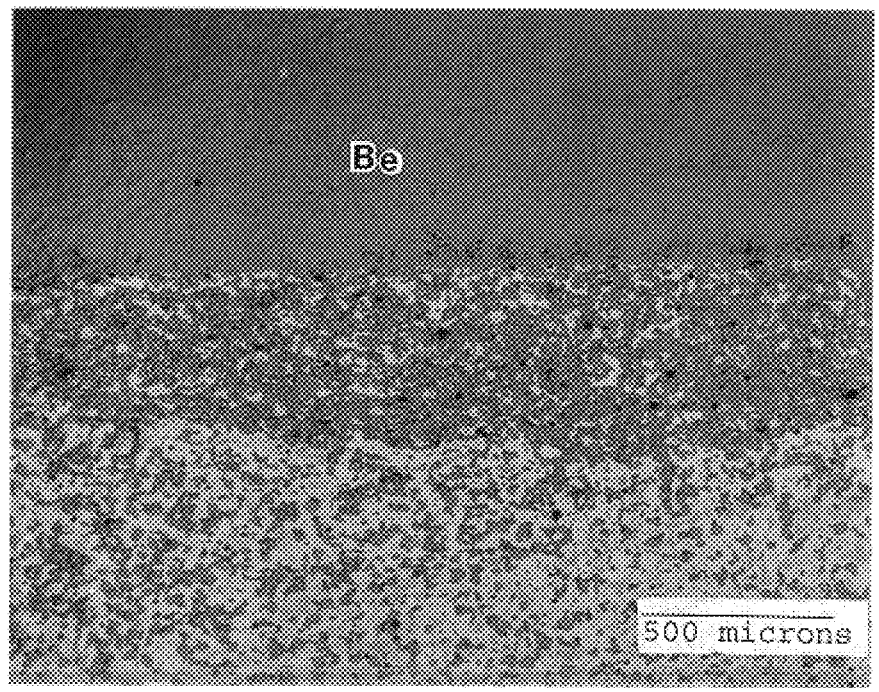
FIG. 4a is a micrograph at 50×magnification showing the structure of the bond produced in HIP can 1470 of Example I at the beryllium rich bonding layers directly below the beryllium cylinder.
Figure 4B:
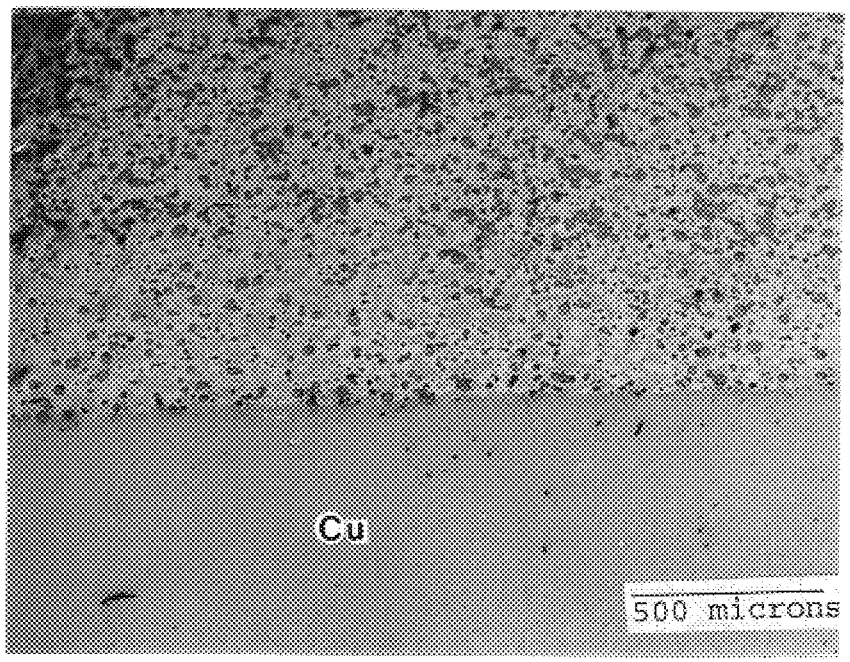
FIG. 4b is a micrograph at 50×magnification showing the structure of the bond produced in HIP can 1470 of Example I at the copper rich bonding layers directly above the copper cylinder.

Provided in FIGS. 4a–c is an overlapping sequence of bright field photomicrographs at 50×magnification showing the 500 micron grain structure of the bond produced in HIP can 1470. FIG. 4a shows beryllium rich bonding layers directly below the beryllium cylinder, FIG. 3b illustrating bonding layers between FIGS. 3a and 3c and FIG. 3c the copper rich bonding layers directly above the copper cylinder.

EXAMPLE II

In this example, the benefits of mixing three distinct powders in compositional gradient layers are shown as well as one methodology for distributing the bonding aid powder throughout the layers. In particular, a bonding aid powder distribution is shown where the bonding aid concentration reaches: (i) a minimum level at the interface between the solid beryllium and powder layers, (ii) a maximum concentration at a point equidistant from the interface between the beryllium and powder layers, and the interface between the solid copper alloy and powder layers, and (iii) a minimum concentration at the interface between solid copper alloy and powder layers.

Silicon powder was used as a bonding aid since it does not form compounds with beryllium and because it meets radiation safety standards described above, when irradiated by neutrons.

The powder mixing procedure is the same as in Example I above except for the composition of the layers. The composition of the layers after mixing is shown in Table IV below.

Layer 5 was loaded into a cylindrical die in a 60 ton Bussman-Simetag cold press. Layers 4-1 were placed on top of this layer in reverse order. The whole compact was then cold pressed into a disk. The layers are inserted as individual cold pressed disks or together as a monolithic cold pressed disk.

TABLE IV

Composition of compositional gradient layers made from beryllium, silicon and copper powders for Example II.

| Layer No. | Vol % Be | Vol % Cu | Vol % Si | g Be | g Cu | g Si | Total g |
|---|---|---|---|---|---|---|---|
| 1 | 50 | 25 | 25 | 1.6475 | 3.9896 | 1.0370 | 6.6742 |
| 2 | 37.5 | 25 | 37.5 | 1.2356 | 3.9896 | 1.0370 | 6.7808 |
| 3 | 25 | 25 | 50 | 0.8237 | 3.9896 | 1.0370 | 6.8875 |
| 4 | 25 | 37.5 | 37.5 | 0.8237 | 5.9844 | 1.5555 | 8.3638 |
| 5 | 25 | 50 | 25 | 0.8237 | 7.9793 | 2.0740 | 9.8401 |

The HIP can loading and degassing procedures are the same as shown in Example I. The HIP procedure is the same as in Example I, except for the temperature, which is shown below in Table V.

TABLE V

HIP Can Number and HIP Temperature

| HIP Can No. | Contents | HIP Temp. (°C.) |
|---|---|---|
| 1477 | Be, Be + Si + Cu Powder Mix, and Cu | 600 |

It is believed that the elevated temperature bond strength will be particularly favorable when using copper alloys which have higher elevated temperature strength, are thermally stable during the bonding process, and are age hardenable.

Although the present invention is shown and described in connection with copper alloys, including commercially pure copper, or high purity copper, it is understood that other compositions of copper and its alloys may be suitable including, but not limited to, HYCON 3 HP, Glidcop AL-15, GlidCop AL-25, copper-chromium-zironconium alloys such as Ebrodur G. It is also appreciated that other grades of beryllium may be appropriate in the context of this invention, in addition to S-65C Grade Be, including S-200F, S-200FH, I-70, I-70H, RUSSIAN FEDERATION DShG-200, TGP-56, and TSHGT.

Further, it is appreciated that each layer of the powder metallurgy compositional gradient may include one or more of the following, in any combination: a copper alloy, high purity copper or other copper containing material, within the spirit and scope of the present invention.

Various modifications and alterations to the present invention may be appreciated based on a review of this disclosure. These changes and additions are intended to be within the scope and spirit of this invention as defined by claims to follow.

What is claimed is:

1. A process for bonding beryllium to copper alloys using a powder metallurgy compositional gradient, wherein a sequence of powder layers is located between solid beryllium and solid copper alloy pieces, each layer containing a mixture of beryllium and copper powders, the process comprising the steps of:
   (i) adjusting the composition of the layers such that the layer adjacent the beryllium piece is beryllium rich, the succeeding layers becoming more copper rich as they get closer to the solid copper piece, so as to produce the compositional gradient; and
   (ii) bonding the beryllium and copper pieces by a hot consolidation technique at a temperature generally within a range of 500° and 800° C. to produce a bond strength in excess of about 35 MPa at a temperature generally within a range of room temperature and 400° C.

2. The process set forth in claim 1 wherein the hot consolidation technique is not isostatic pressing.

3. The process set forth in claim 1 wherein the hot consolidation technique is vacuum hot pressing.

4. The process set forth in claim 1 where the hot consolidation technique is solid state bonding.

5. The process set forth in claim 1 wherein the hot consolidation technique is diffusion bonding.

6. The process set forth in claim 1 wherein the copper powder comprises a copper alloy.

7. The process set forth in claim 1 wherein the copper powder comprises high purity copper.

8. A process for bonding beryllium to copper alloys using a powder metallurgy compositional gradient, wherein a sequence of powder layers is placed between solid beryllium and solid copper alloy forms where the layers are composed of beryllium powder, copper powder, and at least one bonding aid in powder form, each bonding aid being selected on the basis of being safer than neutron irradiated silver and its resistance to formation of beryllium compounds below 700° C., the process comprising the steps of:
   (i) adjusting the composition of the layers such that the layer next to the beryllium form is beryllium rich, the succeeding layers becoming more copper rich as they get closer to the copper piece, so as to produce the compositional gradient; and
   (ii) bonding the beryllium and copper forms by a hot consolidation technique at a temperature generally within a range of 500° and 800° C., to produce a bond strength exceeding about 35 MPa at a temperature generally within a range of room temperature and 400° C.

9. The process set forth in claim 8 wherein at least one bonding aid is germanium.

10. The process set forth in claim 8 wherein at least one bonding aid is aluminum.

11. The process set forth in claim 8 wherein at least one bonding aid is silicon.

12. The process set forth in claim 8 wherein at least one bonding aid is tellurium.

13. The process set forth in claim 8 wherein the hot consolidation technique is hot isostatic pressing.

14. The process set forth in claim 8 wherein the hot consolidation technique is vacuum hot pressing.

15. The process set forth in claim 8 wherein the hot consolidation technique is solid state bonding.

16. The process set forth in claim 8 wherein the hot consolidation technique is diffusion bonding.

17. The process set forth in claim 8 wherein the copper powder comprises a copper alloy.

18. The process set forth in claim 8 wherein the copper powder comprises high purity copper.

* * * * *